Figure 1:
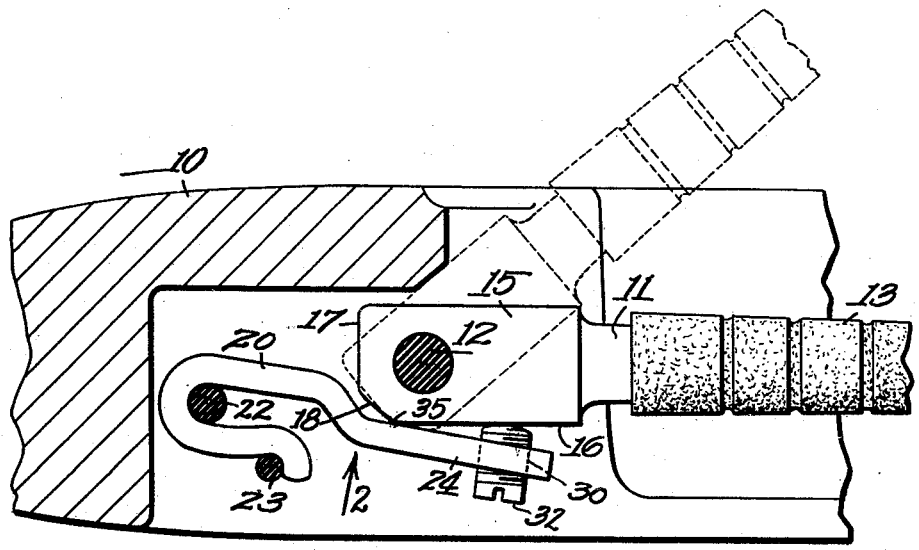

Dec. 29, 1931.  L. GAUVIN  1,838,387
LOOM SHUTTLE
Filed Aug. 5, 1929

Inventor
Louis Gauvin
By attorneys
Southgate Hay + Hawley

Patented Dec. 29, 1931

1,838,387

UNITED STATES PATENT OFFICE

LOUIS GAUVIN, OF WILKINSONVILLE, MASSACHUSETTS

LOOM SHUTTLE

Application filed August 5, 1929. Serial No. 383,694.

This invention relates to loom shuttles of the type in which a pivoted spindle is provided to receive and support the cop or bobbin. It is necessary that the spindles in such shuttles be accurately aligned with the shuttle eye and it is also necessary that this alignment shall be maintained, as otherwise breakage of filling will occur.

It is the object of my invention to provide improved means for vertically aligning a loom shuttle spindle and for adjusting the spindle to maintain its alignment with the shuttle eye.

A further object of the invention is to provide means for more easily seating the spindle as it is snapped into operative position.

My invention further relates to arrangements and combinations of parts which will be hereinafter described and more particularly pointed out in the appended claims.

A preferred form of the invention is shown in the drawings in which

Figure 2:

Fig. 1 is a sectional elevation of parts of a shuttle embodying my improvements; and Fig. 2 is a bottom view of the shuttle spring, looking in the direction of the arrow 2 in Fig. 1.

Referring to the drawings, I have shown portions of a shuttle body 10 in which a spindle 11 is pivotally mounted on a cross pin 12. The spindle 11 is adapted to support a cop 13. The shank 15 of the spindle is provided with a flat side surface 16, a flat end surface 17 and a flat beveled surface 18.

A stiff heavy spring 20 is secured in position by cross pins 22 and 23 and is provided with an offset end portion 24 underlying the shank 15 of the spindle 11. The offset portion 24 near its outer end is provided with a tapped hole 30, adapted to receive an adjusting screw 32.

The end of the spring 20 is also preferably slotted, as indicated at 33, so that the hole 30 may be contracted to provide a close friction fit on the screw 32.

The screw 32 engages the flat under side surface 16 of the spindle 11 and limits downward movement of the spindle. By adjusting the screw 32, the spindle may be raised or lowered to bring it into exact alignment with the shuttle eye (not shown).

The spring 20 also engages the shank 15 of the spindle at the edge or corner 35 between the surfaces 16 and 18 and as this edge is to the left of the axis of the cross pin 12, as viewed in Fig. 1, the spring acts to swing the spindle 11 downward until the shank 15 engages the screw 32. The spring thus engages the shank of the spindle at two spaced points located on opposite sides of the pivotal axis of the spindle and thus definitely determines its position.

When the spindle is swung upward to the dotted line position for the removal or replacement of a cop or bobbin, the surface 18 of the spindle shank engages the spring 20 and holds the spindle yieldingly in raised position.

When the spindle is returned to operative position, it is commonly snapped downward with considerable force. With my improved construction, however, the downward movement of the spindle is limited by the screw 32, which is mounted in the yielding spring 20, so that the spring and screw not only determine the alignment of the spindle but also provide means by which the spindle is more gradually seated and the wear of the parts is materially reduced. Should a limited amount of wear occur, however, so that the spindle sags below the shuttle eye, the alignment may be quickly and easily restored by simply turning the adjusting screw 32.

Having thus described my invention and the advantages thereof, I do not wish to be limited to the details herein disclosed, otherwise than as set forth in the claims, but what I claim is:—

1. In a loom shuttle, a pivoted spindle, a spring effective to yieldingly maintain said spindle in operative or inoperative positions, and means to yieldingly seat said spindle as it approaches operative position and to yieldingly resist movement of said spindle beyond operative position, said means being also effective to determine the alignment of said spindle with the shuttle eye.

2. In a loom shuttle, a pivoted spindle, a spring effective to yieldingly maintain said spindle in operative or inoperative positions, and a screw threaded in the end of said spring and engaging said spindle to yieldingly align the spindle with the shuttle eye.

3. In a loom shuttle, a pivoted spindle, a spring effective to yieldingly maintain said spindle in operative or inoperative positions, and a screw threaded in the end of said spring and engaging said spindle to yieldingly align the spindle with the shuttle eye, said screw being engaged by said spindle and said spring acting in a direction to reduce excess movement of said spindle as said spindle approaches operative position.

4. In a loom shuttle, a pivoted spindle, and a spring effective to yieldingly maintain said spindle in operative or inoperative positions, said spring directly engaging the shank of said spindle at two points of contact substantially spaced apart and located on opposite sides of the pivotal axis of said spindle and said spring acting in the opposite direction and at a longer leverage and at a greater distance from the axis of said spindle as the spindle approaches operative position.

In testimony whereof I have hereunto affixed my signature.

LOUIS GAUVIN.